United States Patent
Hirano (10) Patent No.: US 8,155,532 B2
(45) Date of Patent: Apr. 10, 2012

(54) OPTICAL TRANSMISSION APPARATUS, OPTICAL TRANSMISSION SYSTEM, APPARATUS CONTROL METHOD, AND RECORDING MEDIUM ON WHICH PROGRAM FOR THE APPARATUS IS RECORDED

(75) Inventor: Kengo Hirano, Tokyo (JP)

(73) Assignee: NEC Corporation, Tokyo (JP)

( * ) Notice: Subject to any disclaimer, the term of this patent is extended or adjusted under 35 U.S.C. 154(b) by 465 days.

(21) Appl. No.: 12/403,032

(22) Filed: Mar. 12, 2009

(65) Prior Publication Data
US 2009/0232516 A1 Sep. 17, 2009

(30) Foreign Application Priority Data
Mar. 17, 2008 (JP) ................. 2008-068131

(51) Int. Cl.
*H04B 10/00* (2006.01)
(52) U.S. Cl. ........ 398/164; 398/182; 398/168; 398/171; 398/138
(58) Field of Classification Search .................. 398/164, 398/182, 168, 171, 138, 137
See application file for complete search history.

(56) References Cited

U.S. PATENT DOCUMENTS
| | | | | |
|---|---|---|---|---|
| 2007/0237468 A1* | 10/2007 | Aronson et al. | ............... | 385/100 |
| 2008/0089693 A1* | 4/2008 | El-Ahmadi et al. | .......... | 398/135 |
| 2010/0189433 A1* | 7/2010 | Trojer | ............................... | 398/8 |

FOREIGN PATENT DOCUMENTS
JP 2004104376 A 4/2004
KR 20-2008-0003847 A 9/2008

OTHER PUBLICATIONS
Korean Office Action for KR10-2009-0021702 issued Aug. 27, 2010.

* cited by examiner

*Primary Examiner* — Kinam Park

(57) ABSTRACT

A removable optical interface module is used to allow an optical transmission apparatus to flexibly respond to a change from a type of service to another that uses a different light wavelength. To this end, the optical transmission apparatus is removably provided with an optical interface module storing attribute information and includes a plurality of service implementation units implementing services using signals transmitted and received through the optical interface module. An operation selecting unit is provided which selects and causes a service implementation unit among the plurality of service implementation units that implement a service corresponding to the attribute information to operate.

20 Claims, 9 Drawing Sheets

F I G. 2

F I G. 4

GE-PON SYSTEM SERVICE TYPE CORRESPONDENCE TABLE

| DOWNSTREAM RATE \ UPSTREAM RATE | 1Gbps | 10Gbps | Others |
|---|---|---|---|
| 1Gbps | DOWNSTREAM 1G / UPSTREAM 1G SERVICE | NOT APPLICABLE | NOT APPLICABLE |
| 2Gbps | DOWNSTREAM 2G / UPSTREAM 1G SERVICE | NOT APPLICABLE | NOT APPLICABLE |
| 10Gbps | DOWNSTREAM 10G / UPSTREAM 1G SERVICE | DOWNSTREAM 10G / UPSTREAM 10G SERVICE | NOT APPLICABLE |
| Others | NOT APPLICABLE | NOT APPLICABLE | NOT APPLICABLE |

F I G. 5

MAC UNIT POWER SUPPLY CORRESPONDENCE TABLE     [LEGENDS] ○ : POWER SUPPLIED   × : POWER NOT SUPPLIED

| | DOWNSTREAM 1G / UPSTREAM 1G MAC UNIT | DOWNSTREAM 2G / UPSTREAM 1G MAC UNIT | DOWNSTREAM 10G / UPSTREAM 1G MAC UNIT | DOWNSTREAM 10G / UPSTREAM 1G MAC UNIT |
|---|---|---|---|---|
| DOWNSTREAM 1G / UPSTREAM 1G SERVICE INFORMATION | ○ | × | × | × |
| DOWNSTREAM 2G / UPSTREAM 1G SERVICE INFORMATION | × | ○ | × | × |
| DOWNSTREAM 10G / UPSTREAM 1G SERVICE INFORMATION | × | × | ○ | × |
| DOWNSTREAM 10G / UPSTREAM 10G SERVICE INFORMATION | × | × | × | ○ |
| NOT APPLICABLE | × | × | × | × |

FIG. 8

OPTICAL TRANSMISSION APPARATUS, OPTICAL TRANSMISSION SYSTEM, APPARATUS CONTROL METHOD, AND RECORDING MEDIUM ON WHICH PROGRAM FOR THE APPARATUS IS RECORDED

This application is based upon and claims the benefit of priority from Japanese patent application No. 2008-068131, filed on Mar. 17, 2008, the disclosure of which is incorporated herein in its entirety by reference.

BACKGROUND OF THE INVENTION

1. Field of the Invention

The present invention relates to an optical transmission apparatus, such as an ONU (Optical Network Unit) used in a PON (Passive Optical Network), that uses an optical interface module to perform optical communication, an optical transmission system, an optical transmission apparatus control method, and a recording medium on which a program for the apparatus is recorded.

2. Description of Related Art

Figure 1:
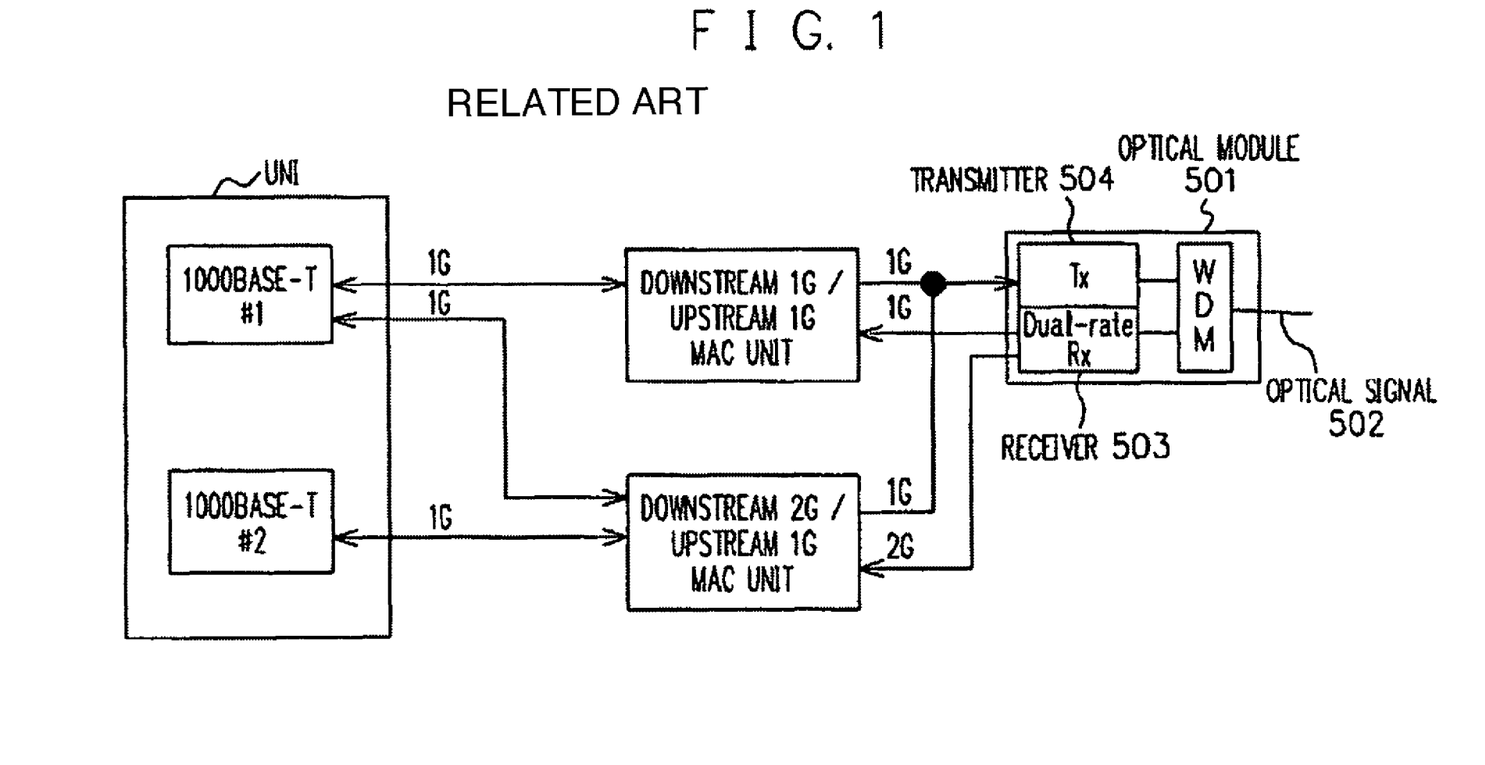
FIG. 1 shows a configuration of a typical dual-rate ONU.

A configuration of a typical dual-rate ONU will be described with reference to FIG. 1. A typical dual-rate ONU as shown in FIG. 1 includes an optical module unit 501 that transmits and receives optical signals to and from an optical transmission line. The optical module unit 501 includes a receiver (Rx) 503 capable of receiving optical signals 502 with the same wavelength at two different bit rates and a transmitter (Tx) 504. This configuration enables the exemplary ONU shown in FIG. 1 to receive optical signals with the same wavelength at dual rates of, 1 Gbps and 2 Gbps.

In an art related to the present invention, packets received at a subscriber connection apparatus on a PON are distributed to multiple PON termination circuits and multiple user network interfaces (UNIs) by a multiplexer/demultiplexer, thereby reducing equipment costs per UNI line (see for example Japanese Patent Laid Open Publication No. 2004-104376).

Problems with the existing techniques describe above will be described below.

The typical dual-rate ONU apparatus described has the following problems.

A first problem is that the optical module cannot deal with different service modes that use downstream optical signals with different wavelengths because its receiver 503 supports different bit rates provided that the signals are in the same wavelength band.

A second problem is that the optical module cannot deal with different service modes that use upstream optical signals with different wavelengths and different bit rates because its transmitter 504 supports only the same bit rate in the same wavelength band.

When a subscriber wants to migrate to a different service type, the subscriber has to replace the whole ONU with a new one since the ONU cannot deal with optical signals in different wavelength bands as described above. The replaced ONU is discarded and therefore the problem of recycling of discarded ONUs has arisen.

The technique disclosed in Japanese Patent Laid Open Publication No. 2004-104376 is intended to reduce equipment costs by allowing an optical network interface to be shared by multiple PON termination circuits and multiple UNIs and does not make consideration to use a removable optical interface module to allow the apparatus to respond to a change from a type of service to another that uses a different light wavelength.

SUMMARY

The present invention has been made to solve the problems describe above. Therefore, an object of the present invention is to provide an optical transmission apparatus, optical transmission system and apparatus control method capable of responding to a change from a type of service to another that uses a different light wavelength by using a removable optical interface module, and a recording medium on which a program for the apparatus is recorded.

In order to achieve the object, an optical transmission apparatus according to the present invention is removably provided with an optical interface module storing attribute information, and includes multiple service implementation units implementing services by using signals transmitted and received through the optical interface module and an operation selecting unit causing a service implementation unit that implements a service corresponding to the attribute information among the multiple service implementation units to operate.

An optical transmission system according to the present invention includes multiple optical transmission apparatuses according to the present invention described above that are connected to an optical line termination through optical transmission lines.

An apparatus control method according to the present invention controls an optical transmission apparatus including multiple service implementation units implementing services by using signals transmitted and received through a removable optical interface module. The apparatus control method includes: a receiving step of receiving, by the optical transmission apparatus, attribute information of the optical interface module from the optical interface module; and an operation selecting step of causing, among the multiple service implementation units, a service implementation unit, that implements a service corresponding to the attribute information received at the receiving step to operate.

According to the present invention, there is provided a recording medium on which recorded is a program for an optical transmission apparatus including multiple service implementation units implementing services using signals transmitted and received through a removable optical interface module. The program causes a computer of the optical transmission apparatus to perform a receiving step of receiving, by the optical transmission apparatus, attribute information of the optical interface module from the optical interface module, and an operation selecting step of causing, among the multiple service implementation units, a service implementation unit that implements a service corresponding to the attribute information received at the receiving step to operate.

BRIEF DESCRIPTION OF THE DRAWINGS

The objects and features of the present invention will become more apparent from the consideration of the following detailed description taken in conjunction with the accompanying drawings, in which.

EXEMPLARY EMBODIMENT

Referring to the accompanying drawings, one exemplary embodiment will be described below in detail in which an optical transmission apparatus, optical transmission system, apparatus control method, and a program for the apparatus according to the present invention are applied to a Gigabit Ethernet Passive Optical Network (GE-PON) system.

An outline of the embodiment will be described first.

Figure 2:
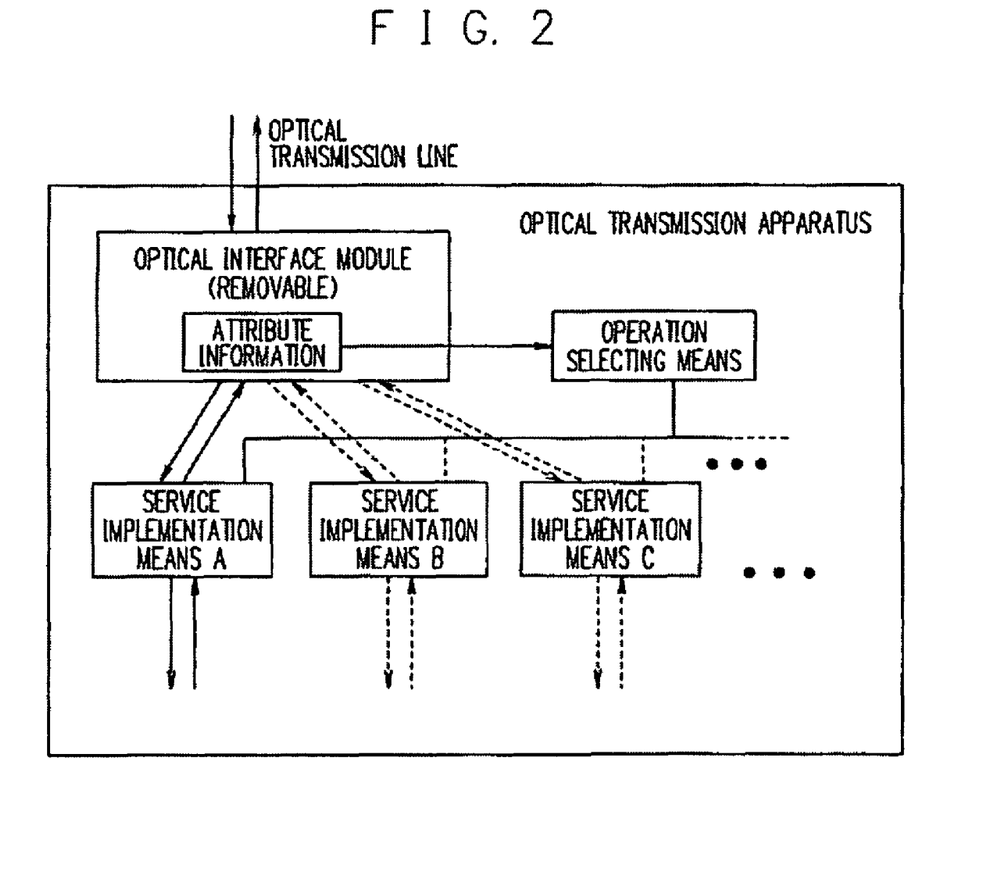
FIG. 2 is a schematic diagram showing an exemplary embodiment of the present invention.

As shown in FIG. 2, the optical transmission apparatus according to the present embodiment is removably provided with an optical interface module storing attribute information and includes a plurality of service implementation means implementing services by using signals transmitted and received through the optical interface module. Operation selecting means controls the plurality of service implementation means so as to cause only the service implementation means that implements a service corresponding to the attribute information of the optical interface module attached to operate.

The optical transmission apparatus includes service implementation means that implements an intended service and yet is capable of switching between the service implementation means in accordance with attribute information of the optical interface module attached. Thus, the present embodiment provides a multimode ONU that is capable of operating for a service according with the optical interface module attached.

More specifically, the present embodiment is characterized by the capability of flexibly changing the mode of an ONU installed on a subscriber side in a GE-PON system to suit to the type of service by replacing an XFP optical module. XFP is one of industry standards for 10 GbE (10 Gigabits Ethernet (registered trademark)) pluggable modules, developed by the "XFP Module Group" and is the nominal designation of 10 Gigabit Small Form Factor Pluggable.

Therefore, the optical transmission apparatus of the present embodiment has the following features.

First, an optical module unit that communicates with an optical line termination (OLT) is designed as an XFP.

Second, for each service type, a MAC (Media Access Control) unit, a UNI (User-Network Interface) unit, and a UNI SEL (User-Network-Interface selector) unit that supports the service are provided.

Third, based on information indicating the type of the optical module (attribute information) which is provided from a management interface of the XFP optical module unit described above, a control (CTRL) unit determines a corresponding service type and a power supply controller (operation selecting unit) turns on only a power supply for one combination that corresponds to the service type among the combinations of a MAC unit, UNI SEL unit, and UNI unit supporting service types described above.

A configuration of the ONU of the present embodiment will be described with reference to FIG. 3.

Figure 3:
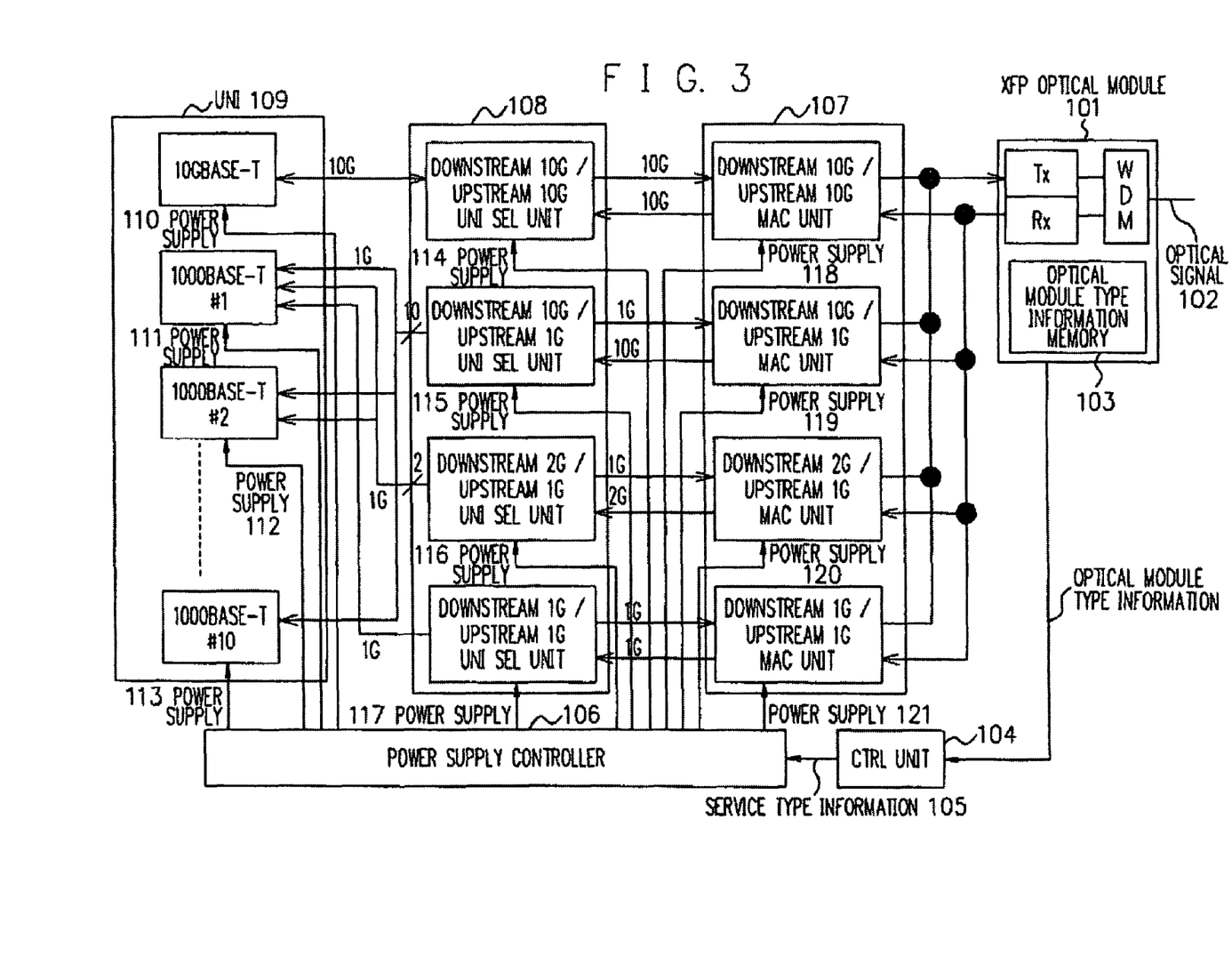
FIG. 3 is a block diagram showing an exemplary configuration of an ONU according to an exemplary embodiment of the present invention.

As shown in FIG. 3, the ONU of the present embodiment includes service implementation means, such as MAC units 107, UNI SEL units 108, and UNI units 109, for each type of services supported, that is, downstream 10 G/upstream 10 G, downstream 10 G/upstream 1 G, downstream 2 G/upstream 1 G, and downstream 1 G/upstream 1 G services in the example in FIG. 3.

The XFP optical module unit (optical interface module) 101 includes an optical module type information memory (attribute information storing means) 103 storing optical module type information (attribute information). The XFP optical module unit 101 provides the optical module type information in the optical module type information memory 103 to a CTRL unit 104 (type information converting means) through a management interface, not shown.

Based on the optical module type information received, the CTRL unit 104 determines a corresponding service type mode and provides service type information 105 to a power supply controller (operation selecting unit) 106.

Figure 4:
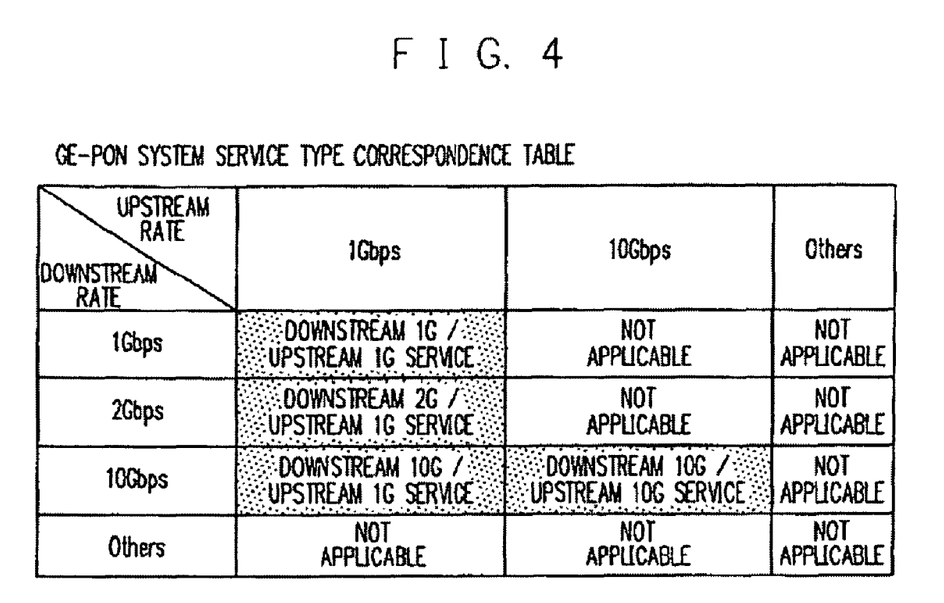
FIG. 4 is a diagram showing correspondence between service types and bit rate combinations for conversion by a CTRL unit.

In the case of a GE-PON system, the CTRL unit 104 uses only upstream and downstream rate information in the received optical module type information to determine the corresponding service type mode. FIG. 4 shows a translation correspondence table of combinations of service types and bit rates. For combinations of services that are not supported, the CTRL unit 104 determines that there is not a corresponding service.

When the power supply controller 106 receives service type information 105, the power supply controller 106 supplies power only to the MAC unit 107, UNI SEL unit 108, and UNI unit 109 corresponding to the service type.

Figure 5:
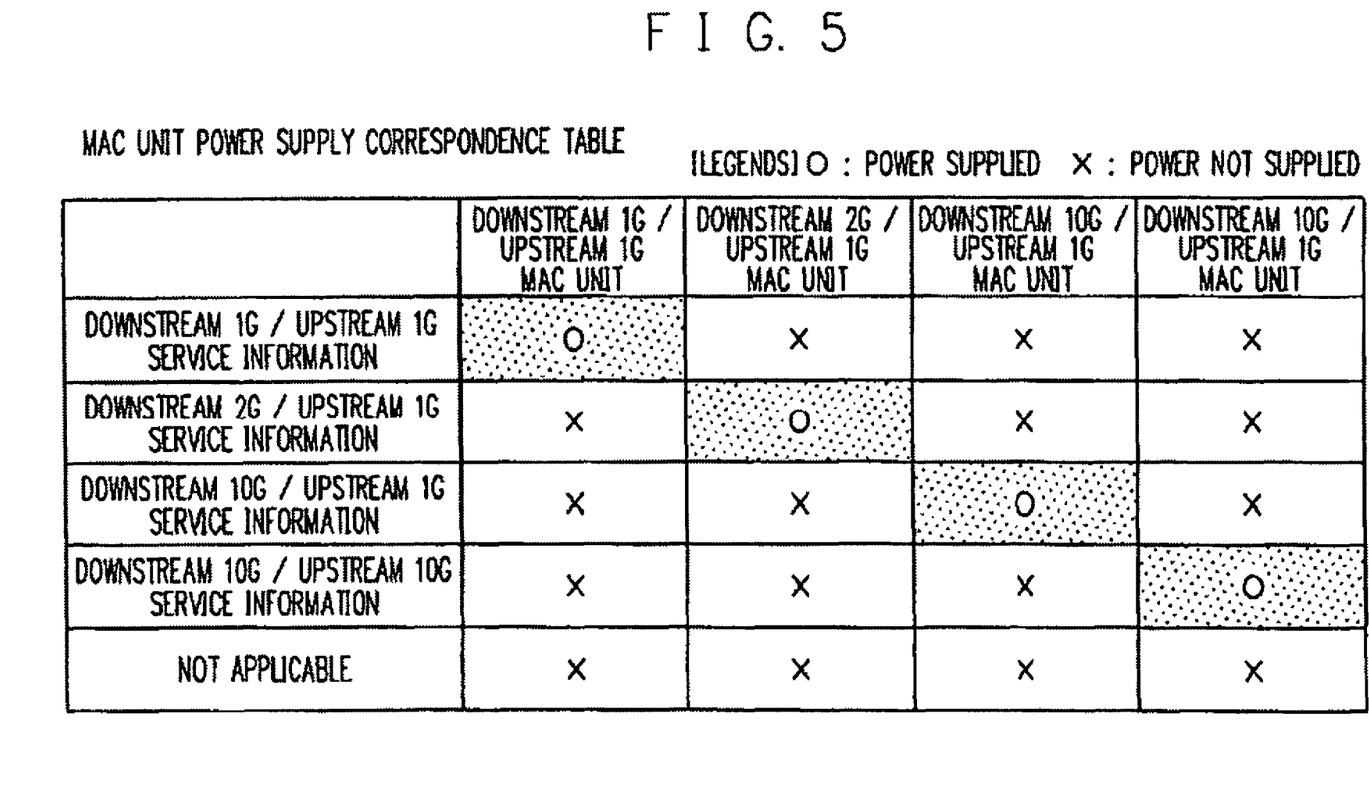
FIG. 5 is a diagram showing combinations of service type information and MAC units referred to by a power supply controller.

In this way, the power supply controller 106 supplies power only to an appropriate MAC unit 107, UNI SEL unit 108, and UNI unit 109 on the basis of service type information generated at the CTRL unit 104. FIG. 5 shows a table of combinations of the service type information and corresponding MAC units. With respect to UNI SEL unit 108 and UNI unit 109 that implement the service, the power supply controller 106 similarly supplies power. If there is not a corresponding unit, the power supply controller 106 supplies power to none of the MAC units 107, UNI SEL units 108, and UNI units 109.

As described above, according to the present embodiment, optical module type information stored in the XFP optical module unit is used for control. Based on the optical module type information provided from the management interface of the XFP optical module unit, the CTRL unit determines the corresponding service type mode. The power supply controller 106 uses the service type information to supply power only to the service implementation means (here, the MAC unit, UNI SEL unit, and UNI unit) corresponding to service type to cause the service implementation means to operate. Therefore, according to the present embodiment, the service type mode can be automatically changed simply by replacing the optical module.

Figure 6:
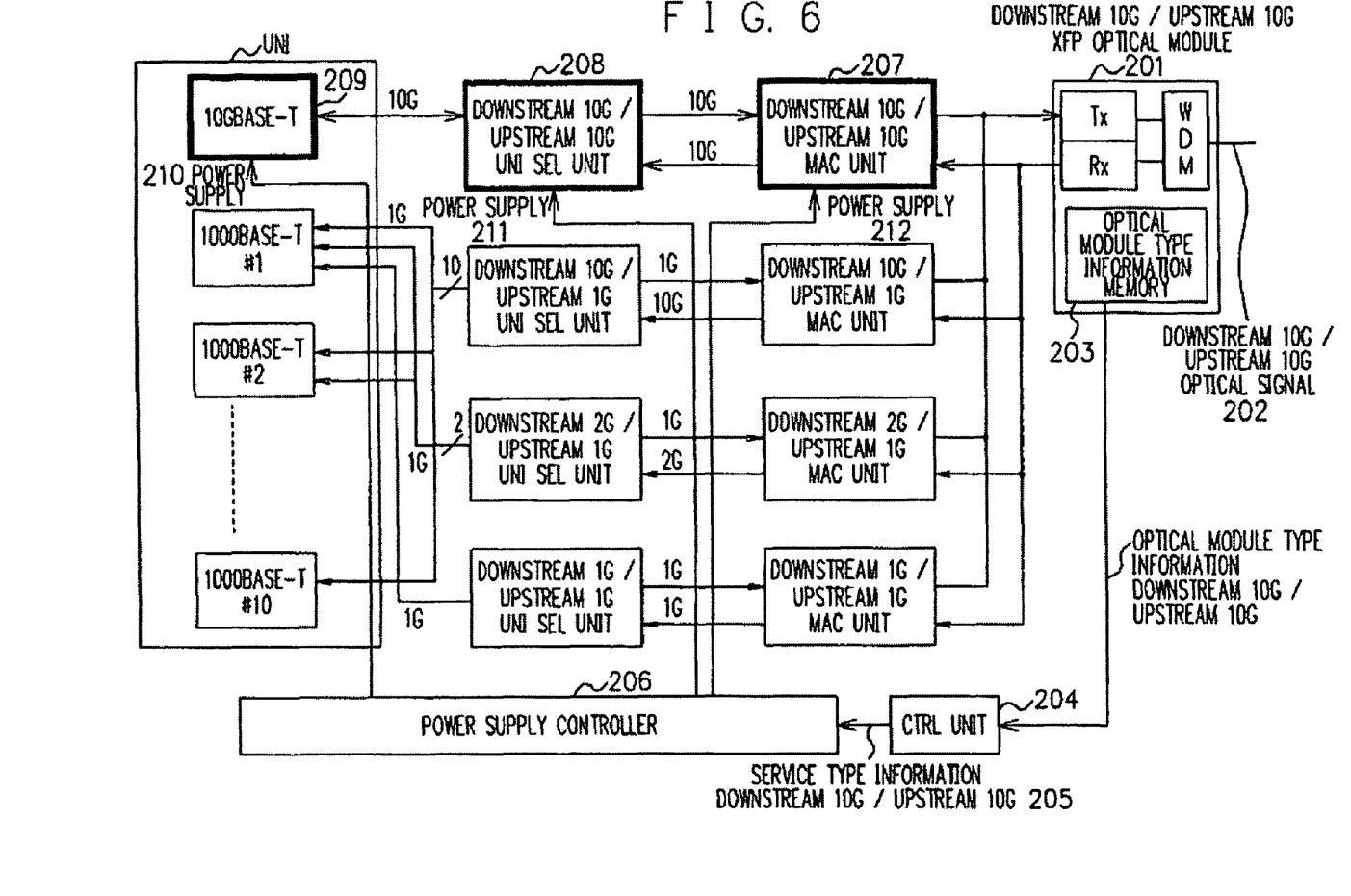
FIG. 6 is a block diagram showing an exemplary configuration of the ONU to which a downstream 10 G/upstream 10 G optical module is attached.

The ONU according to the present embodiment will be described with respect to an example in which an XFP optical module 201 for supporting downstream 10 G/upstream 10 G bps is attached to an optical module slot.

As shown in FIG. 6, when an XFP optical module 201 for downstream 10 G/upstream 10 G bps is attached to the optical module slot of the ONU of the present embodiment, the ONU is automatically placed in a functional mode supporting the service type (downstream 10 G/upstream 10 G) on the basis of the optical module type information (downstream 10 G/upstream 10 G) stored in the optical module type information memory 203 of the XFP optical module 201.

The provision of the optical type information memory 203 in the XFP optical module 201 allows the XFP optical module unit 201 attached to the optical module slot to provide the optical module type information for downstream 10 G/upstream 10 G to the CTRL unit 204.

The CTRL unit 204 determines that the corresponding service type mode is the downstream 10 G/upstream 10 G service mode on the basis of the received optical module type information, and provides service type information 205 to the power supply controller 206.

The power supply controller 206 supplies power 212 to the MAC unit 207 corresponding to the service type of the downstream 10 G/upstream 10 G service, power 211 to the associated UNI SEL unit 208, and power 210 to the associated UNI unit 209.

A configuration of the present embodiment has been described in detail above. The XFP optical module 201 in FIG. 6 is well known to those skilled in the art and is not directly relates to the material part of the present invention, therefore detailed description of which will be omitted.

Figure 7:
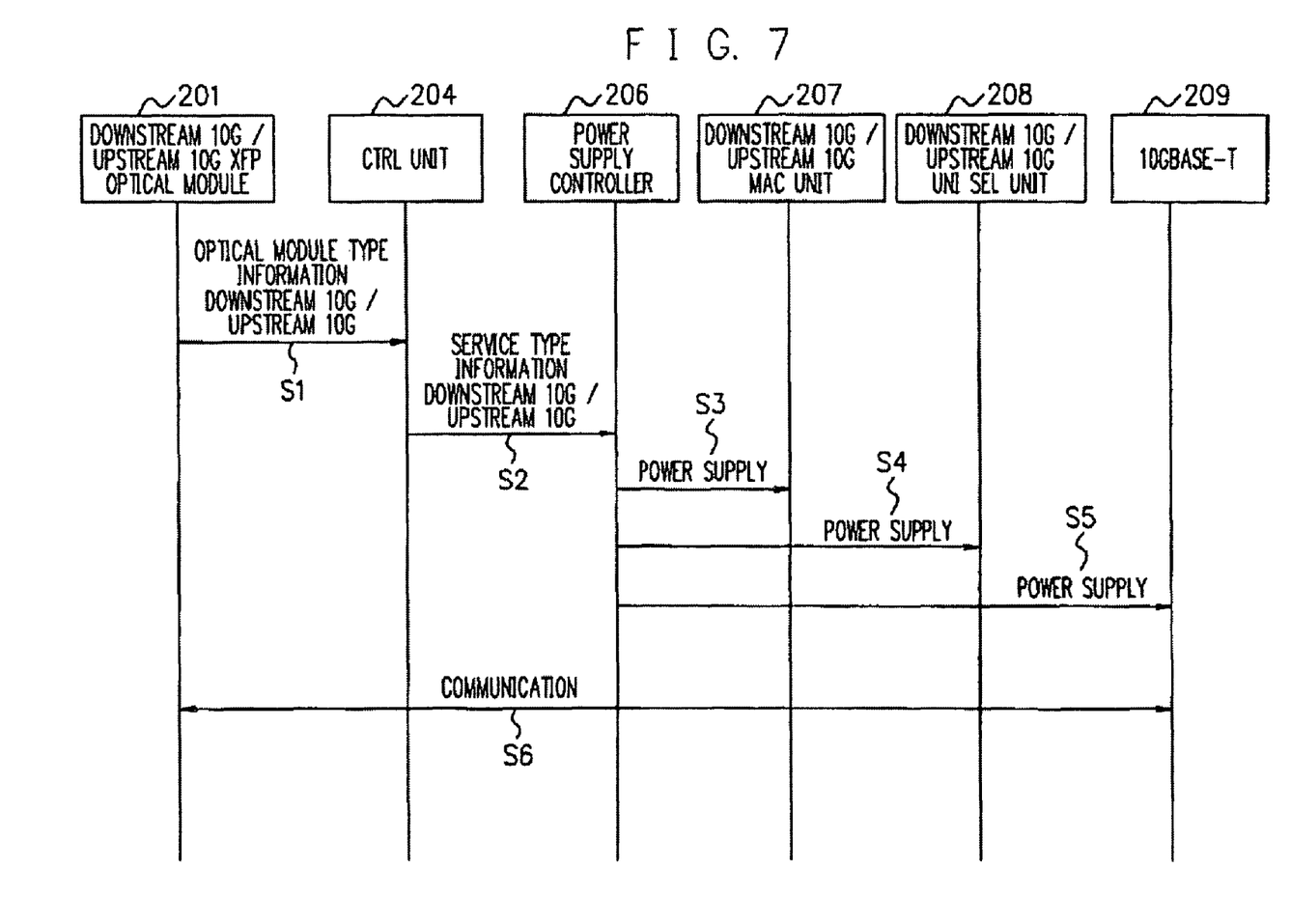
FIG. 7 is a sequence diagram showing a service type change operation in the present embodiment.

Operation for changing the service type mode performed in the exemplary configuration shown in FIG. 6 will be described with reference to a sequence diagram in FIG. 7.

When optical module type information is sent from an XFP optical module 201 to the CTRL unit 204 (step S1), the CTRL unit 204 determines a service type mode on the basis of the received optical module type information, generates service type information 205, and sends the service type information 205 to the power supply controller 206 (step S2).

Based on the received service type information 205, the power supply controller 206 supplies power 212 to the corresponding MAC unit 207 (step S3), power 211 to the corresponding UNI SEL unit 208 (step S4), and power 210 to the corresponding UNI unit 209 (step S5).

Consequently, only the MAC unit 207, UNI SEL unit 208, and UNI unit 209 corresponding to the service type mode of the XFP optical module 201 are enabled to operate. In this way, the ONU of the present embodiment is enabled by the service implementation means to function as an ONU that performs downstream 10 G/upstream 10 G bps communication (step S6).

The present embodiment described above has the following effects.

A first effect is that the user can continue using the ONU apparatus rather than discarding the ONU apparatus because the ONU is capable of being placed in a different service type mode simply by replacing the XFP optical module.

A second effect is that the change from one service mode to another can be automatically made because the corresponding MAC unit, UNI SEL unit, and UNI unit are selected on the basis of information about the type of the XFP optical module.

A third effect is that power consumption can be reduced by preventing power from being supplied to unnecessary functional blocks because the block of the corresponding MAC unit, UNI SEL unit, and UNI unit is selected by supplying power only to the block.

According to the embodiment described above, a multi-mode ONU that supports different service modes that use different light wavelengths can be provided by using a removable optical interface module.

Furthermore, a GE-PON including multiple ONUs descried above connected to an OLT through optical transmission lines can flexibly meet a change from a service mode to another that uses a different light wavelength. Therefore, an optical transmission system with high recyclability can be provided.

Alternative Exemplary Embodiment

An alternative exemplary embodiment of the present invention will be described next.

Figure 8:
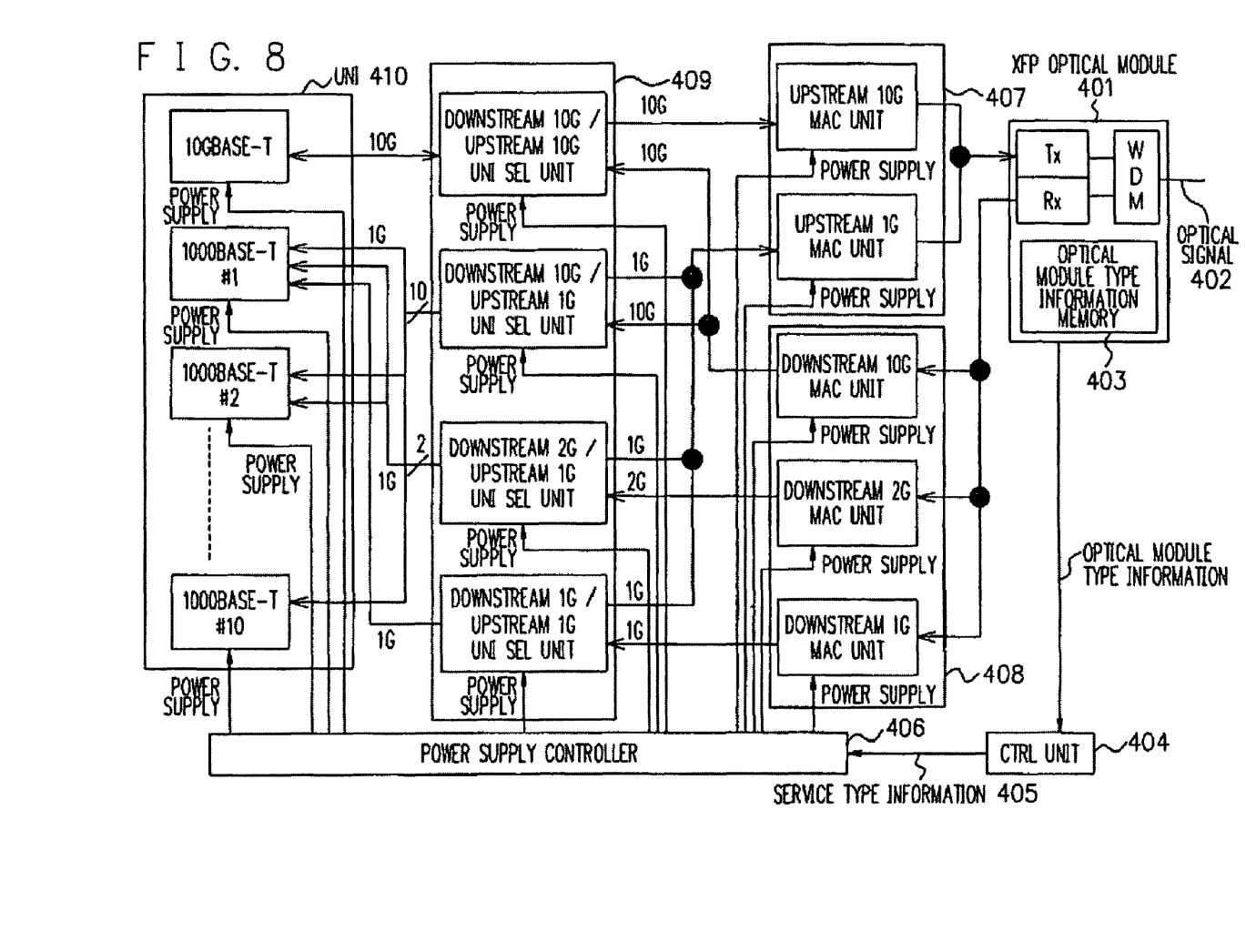
FIG. 8 is a block diagram showing an exemplary configuration of an ONU according to another exemplary embodiment of the present invention.

The basic configuration of the alternative embodiment is the same as that of the embodiment described above, except that a modification is made to MAC units. FIG. 8 shows an exemplary configuration of the alternative embodiment. As shown in FIG. 8, downstream control MAC units 408 and upstream control MAC units 407 in the ONU of the alternative embodiment are provided separately from each other.

When a CTRL unit 404 receives optical module type information from an optical module type information memory 403 of an XFP optical module 401, the CTRL unit 404 determines a service type mode on the basis of the received optical module type information and provides service type information 405 to use to a power supply controller 406.

Based on the received service type information 405, the power supply controller 406 supplies power only to the downstream MAC unit 408 and the upstream MAC unit 407 that correspond to the service type mode to use. Similarly, the power supply controller 406 supplies power only to the UNI SEL 409 and UNI unit 410 that correspond to the service type to use.

Since the MAC units for downstream control and those for upstream control are separated in this way in the alternative embodiment, the number of buses on a printed circuit board used for main signal communications between the MAC units and an XFP optical module can be minimized. As a result, factors that can apply noise to a main signal (the antenna effect due to an unnecessary pattern) can be reduced. Therefore, the alternative embodiment offers the same effects as those of the embodiment described above and, in addition, the effect of improving the characteristics of a main signal.

Various Exemplary Embodiments

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Figure 9:
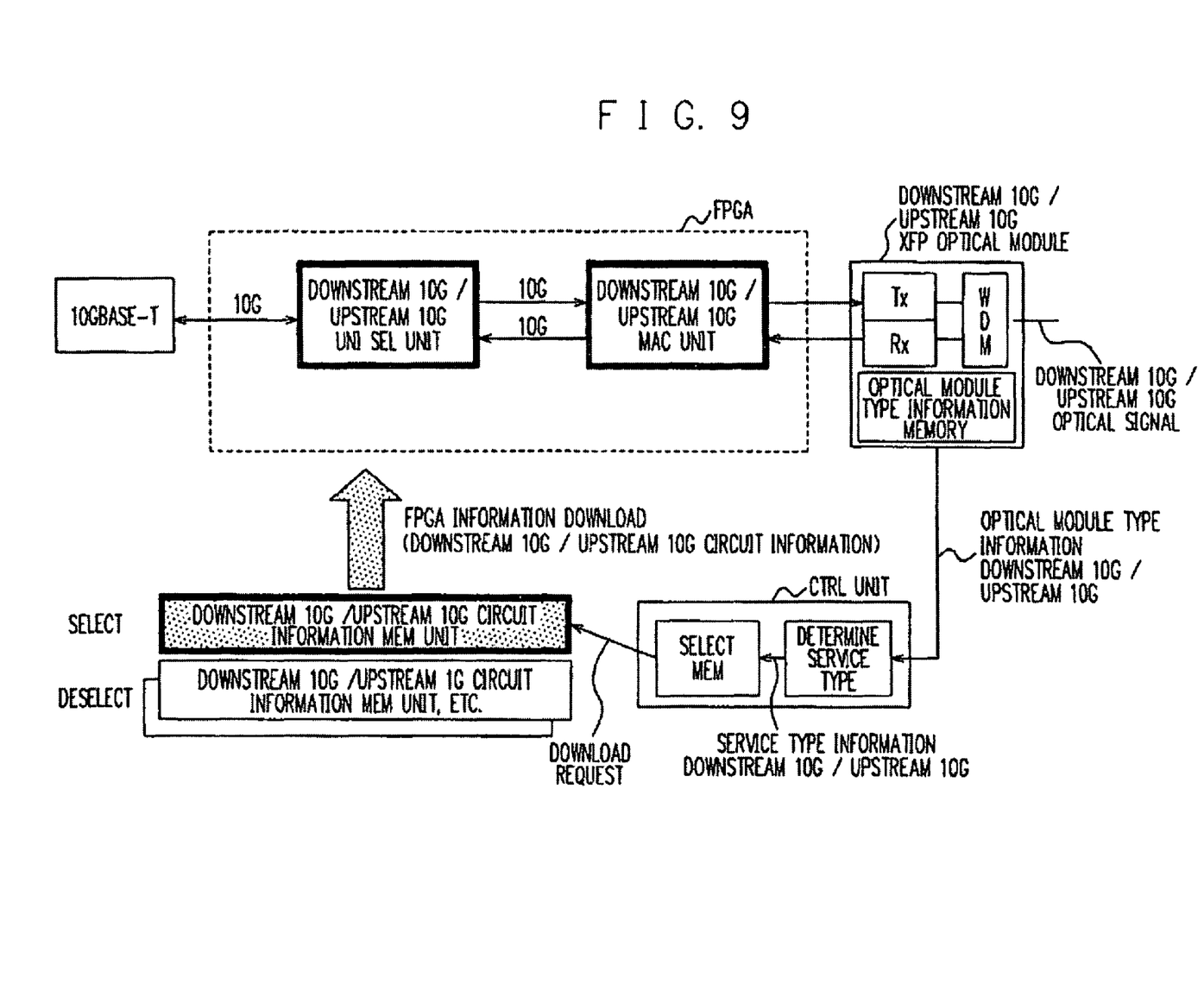
FIG. 9 is a block diagram showing an exemplary configuration of an ONU using a field programmable gate array.

For example, the present invention can be applied to a configuration in which the UNI SEL units and MAC units in any of the embodiments described above are implemented by an FPGA (Filed Programmable Gate Array) as shown in FIG. 9. In this case, information about an FPGA circuit dedicated to each service mode is stored in a memory (MEM) unit of the ONU and the CTRL unit controls download of appropriate FPGA circuit information. This allows only an appropriate circuit to be configured on the FPGA. FIG. 9 shows an exemplary configuration for providing a downstream 10 G/upstream 10 G service.

Thus, the present invention can be applied to the configuration as well in which the service implementation means described above is implemented by an FPGA and an operation mode selection is accomplished by a circuit configured on the FPGA without using the power supply controller.

While the operation selecting means that selects units to activate from among the MAC units, UNI SEL units, and UNI units provided for individual services as service implementation means implementing services by using a signal from the optical module is the power supply controller in the embodiments described above, the operation selecting means is not limited to the power supply controller. The operation selecting means may be any means that can select operation. For example, the present invention can be applied to an implementation as well in which an enable control signal, instead of the power supply method, is used to control enabling and disabling. In this case, the enabling/disabling control by the enable control signal from the CTRL unit controls selection of a MAC unit, UNI SEL unit, and UNI unit to activate.

While an XFP optical module is used in the embodiments described above, the optical interface module is not limited to an XFP optical module. The present invention can be applied to an ONU that uses any of other various removable optical interface modules. In this case, the removable optical interface module stores information about attributes of the optical module (optical module type information) such as the wavelength, transmission rate, and vender name in its optical module type information memory such as a ROM so that the CTRL unit can read the information.

While ONUs used in a GE-PON have been described with respect to the embodiments, the present invention is not limited to this. The present invention can be applied to other various PONs as well.

Furthermore, the present invention is not limited to the implementations described above. The present invention can be applied to other various optical transmission apparatuses and optical transmission systems as well in which a service is determined on the basis of an attribute of an optical interface module.

The processing procedure for implementing an optical transmission apparatus of any of the embodiments described above can be recorded on a recording medium as a program and the program provided from the recording medium can cause the CPU of a computer configuring the system to perform the processing to implement the functions of any of the embodiments according to the present invention. In this case, the present invention can also be applied to an implementation in which an information set including the program is provided from the recording medium or an external recording medium through a network.

That is, the program code itself read from the recording medium implements novel functions of the present invention and the recording medium on which the program code is recoded and signals read from the recording medium configure the present invention. The recording medium may be a medium such as flexible disk, hard disk, optical disk, magneto-optical disk, CD-ROM, CD-R, CD-RW, DVD-ROM, DVD-RAM, DVD-RW, DVD+RW, magnetic tape, nonvolatile memory card, or ROM.

The recording medium on which the program according to the present invention is recorded enables an optical transmission apparatus such as an ONU controlled by the recorded program to implement the functions of any of the embodiments described above.

As has been described above, according to the present invention, a flexibly response to a change from a service type to another that uses a different light wavelength can be achieved by using a removable optical interface module.

What is claimed is:

1. An optical transmission apparatus removably provided with an optical interface module storing attribute information, the optical transmission apparatus comprising:
a plurality of service implementation units that implement services by using signals transmitted and received through the optical interface module; and
an operation selecting unit that causes, among the plurality of service implementation units, a service implementation unit that implements a service corresponding to the attribute information to operate.

2. The optical transmission apparatus according to claim 1, further comprising a type information converting unit that outputs service type information indicating the service corresponding to the attribute information on the basis of the attribute information;
wherein the operation selecting unit selects the service implementation unit on the basis of the service type information provided from the type information converting unit to cause the service implementation unit to operate.

3. The optical transmission apparatus according to claim 1, wherein each of the plurality of service implementation units comprises a Media Access Control (MAC) unit, a User-Network Interface (UNI) selector unit, and a User-Network Interface (UNI) unit that correspond to a service implemented by the service implementation unit.

4. The optical transmission apparatus according to claim 3, wherein the MAC unit includes an upstream MAC unit and a downstream MAC unit.

5. The optical transmission apparatus according to claim 1, wherein the operation selecting unit is a power supply control unit that supplies power to the service implementation unit that implements the service corresponding to the attribute information.

6. The optical transmission apparatus according to claim 3, further comprising a memory unit storing circuit information concerning circuits of the MAC unit and the UNI selector unit; and
a Field Programmable Gate Array (FPGA) on which a circuit is configured on the basis of the circuit information in the memory unit;
wherein the MAC unit and the UNI selector unit is configured with the FPGA.

7. An optical transmission system including a plurality of the optical transmission apparatuses according to claim 1 which are connected to an optical line termination through optical transmission lines.

8. An apparatus control method for controlling an optical transmission apparatus comprising a plurality of service implementation units that implement services by using signals transmitted and received through a removable optical interface module, the apparatus control method comprising:
a receiving step of receiving, by the optical transmission apparatus, attribute information of the optical interface module from the optical interface module; and
an operation selecting step of causing, among the plurality of service implementation units, a service implementation unit that implements a service corresponding to attribute information received at the receiving step to operate.

9. The apparatus control method according to claim 8, further comprising, between the receiving step and the operation selecting step, a type information converting step of converting attribute information received at the receiving step to service type information indicating the service corresponding to the attribute information and outputting the service type information;
wherein, in the operation selecting step, the service implementation unit is selected to operate on the basis of the service type information.

10. The apparatus control method according to claim 8, wherein each of the plurality of service implementation units is configured to comprise a Media Access Control (MAC)

unit, a User-Network Interface (UNI) selector unit, and a User-Network Interface (UNI) unit that correspond to a service implemented by the service implementation unit.

11. The apparatus control method according to claim 10, wherein the MAC unit is configured to include an upstream MAC unit and a downstream MAC unit.

12. The apparatus control method according to claim 8, wherein, in the operation selecting step, a power supply control unit supplies power to the service implementation unit that implements the service corresponding to the attribute information.

13. The apparatus control method according to claim 10, wherein:
the optical transmission apparatus comprises a memory unit storing circuit information concerning circuits of the MAC unit and the UNI selector unit; and
a Field Programmable Gate Array (FPGA) on which a circuit is configured on the basis of the circuit information in the memory unit;
wherein, in the operation selecting step, the MAC unit and the UNI selector unit that implement a service corresponding to attribute information received at the receiving step are configured with the FPGA.

14. A recording medium on which a program for an optical transmission apparatus is recorded, the optical transmission apparatus including a plurality of service implementation units that implement services using signals transmitted and received through a removable optical interface module, the program causing a computer of the optical transmission apparatus to perform:
a receiving step of receiving, by the optical transmission apparatus, attribute information of the optical interface module from the optical interface module; and
an operation selecting step of causing, among the plurality of service implementation units, a service implementation unit that implements a service corresponding to attribute information received at the receiving step to operate.

15. The recording medium on which a program for an optical transmission apparatus is recorded according to claim 14, wherein the program further causes the computer to perform, between the receiving step and the operation selecting step, a type information converting step of converting attribute information received at the receiving step to service type information indicating the service corresponding to the attribute information and outputting the service type information;
wherein, in the operation selecting step, the service implementation unit is selected to operate on the basis of the service type information.

16. The recording medium on which a program for an optical transmission apparatus is recorded according to claim 14, wherein each of the plurality of service implementation units is configured to comprise a Media Access Control (MAC) unit, a User-Network Interface (UNI) selector unit, and a User-Network Interface (UNI) unit that correspond to a service implemented by the service implementation unit.

17. The recording medium on which a program for an optical transmission apparatus is recorded according to claim 16, wherein the MAC unit is configured to include an upstream MAC unit and a downstream MAC unit.

18. The recording medium on which a program for an optical transmission apparatus is recorded according to claim 14, wherein, in the operation selecting step, a power supply control unit supplies power to the service implementation unit that implements the service corresponding to the attribute information.

19. The recording medium on which a program for an optical transmission apparatus is recorded according to claim 16, wherein the optical transmission apparatus comprises a memory unit storing circuit information concerning circuits of the MAC unit and the UNI selector unit; and
a Field Programmable Gate Array (FPGA) on which a circuit is configured on the basis of the circuit information in the memory unit; and
in the operation selecting step, the MAC unit and the UNI selector unit that implement a service corresponding to attribute information received at the receiving step are configured with the FPGA.

20. An optical transmission apparatus removably provided with an optical interface module storing attribute information, the optical transmission apparatus comprising:
a plurality of service implementation means for implementing services by using signals transmitted and received through the optical interface module; and
operation selecting means for causing, among the plurality of service implementation means, service implementation means for implementing a service corresponding to the attribute information to operate.

* * * * *